Figure 1:
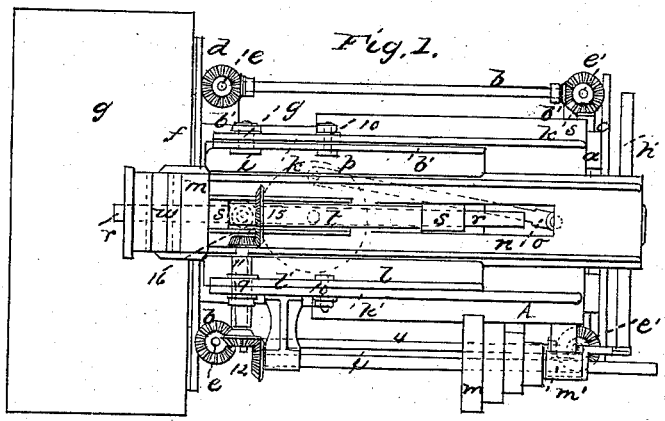

D. SAUNDERS.
Machine for Cutting and Planing Metals.

No. 36,803.

2 Sheets—Sheet 1.

Patented Oct. 28, 1862.

Witnesses:

Inventor

D. SAUNDERS.
Machine for Cutting and Planing Metals.
No. 36,803.
2 Sheets—Sheet 2.
Patented Oct. 28, 1862.
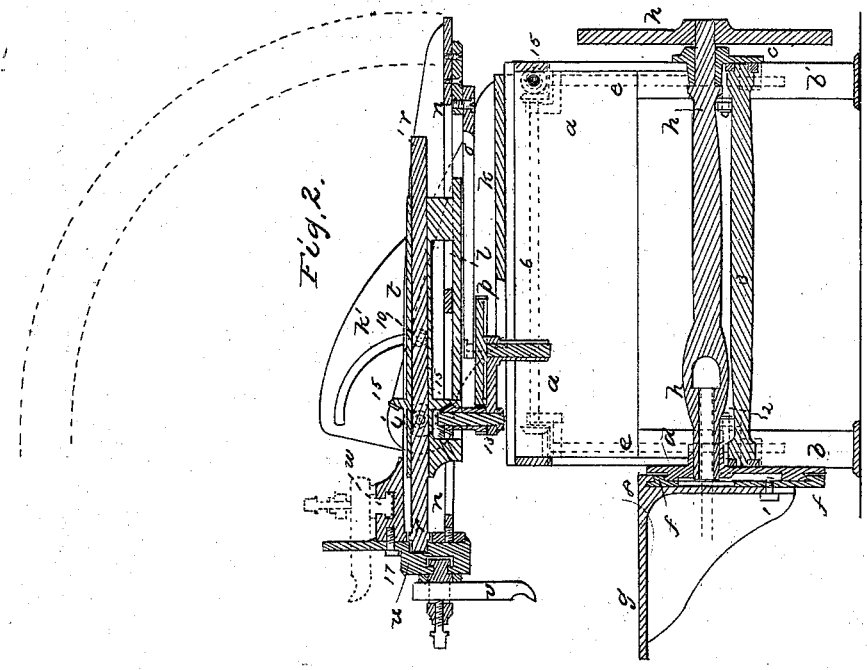
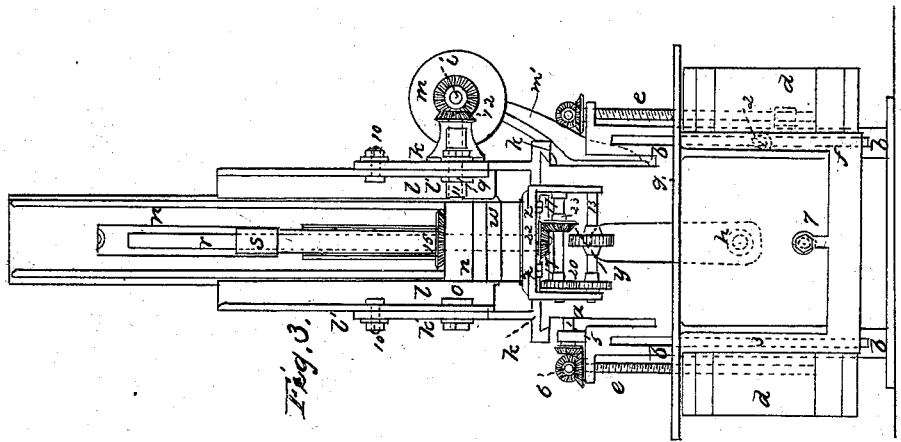
Witnesses:
Inventor:

UNITED STATES PATENT OFFICE.

DAVID SAUNDERS, OF NEW YORK, N. Y.

IMPROVEMENT IN MACHINES FOR CUTTING AND PLANING METALS.

Specification forming part of Letters Patent No. 36,803, dated October 28, 1862.

*To all whom it may concern:*

Be it known that I, DAVID SAUNDERS, of the city and State of New York, have invented and made a certain new and useful Means for Planing and Finishing Articles of Metal; and I do hereby declare that the following is a full, clear, and exact description of the said invention, reference being had to the annexed drawings, making part of this specification, wherein—

Figure 1 is a plan of my machine. Fig. 2 is a vertical section, and Fig. 3 is an end elevation.

Similar marks of reference denote the same parts.

Various machines have been devised for planing, slotting metals, cutting bevel and spur wheels, drilling, and boring, and also for grooving, cutting, or slabbing by a rotary tool or burr.

Heretofore much inconvenience has been experienced for want of a machine capable of performing these various operations, and adapted to shops in which general machine work is done, so as to avoid the cost of many different machines and save the space that would be required.

My invention relates, first, to the mode of adjusting and presenting the metallic article to the finishing-tool; and, second, to the means for operating the various tools required, and directing the action of the same upon the metal.

I will first describe the construction of the machine, and then illustrate some of the various uses to which it may be applied.

In the drawings, $a$ is the bed of the machine, sustained on slotted standards $b\ b\ b'\ b'$.

$c$ is a plate at one end of the machine, provided with nuts and screws 1 1, to attach it to the standards $b'\ b'$, and $d$ is a bed-plate at the other end, similarly provided with nuts and screws 2 2, to attach it to the standards $b\ b$. These two beds $c$ and $d$ are connected by the tie-bar 3, and are raised or lowered simultaneously by the application of right and left handed screws $e\ e$ and $e'\ e'$, driven by bevel-gearing and the shafts 4, 5, and 6, that connect these various bevel-gears, as shown, so that all the screws $e\ e\ e'\ e'$ are turned simultaneously and at the same speed to raise or lower the plates $c$ and $d$ and parts carried by them. The nuts 1 and 2 are to be loosened when the screws $e\ e'$ are turned, and afterward tightened, and in order to revolve the screws $e\ e'$ I have shown a square at the end of the shaft 4 to receive a key.

$f$ is a cross-slide fitted to move in V-shaped guides on the bed-plate $d$, and to give motion to the same a screw or other suitable device might be employed. This slide $f$ carries the bracket-table $g$, that should be provided with holes or under-cut grooves for the reception of bolts and other devices now usual for securing any article to be operated upon. This table $g$ can be removed, when desired, by loosening the screw 7 and lifting said table, in which case the rib 8 is raised above the edge of the slide $f$ and allows the table to be removed.

The device thus far described provides a means for raising or lowering the table $g$ and the article to be operated on that may be secured upon said table, or for moving the same transversely of the machine, so as to bring the part to be operated on in position for the cutters.

In order to sustain a wheel to be cut or any circular article to be operated on by the tools, I employ the same plates $c$ and $d$ but remove the table $g$.

$h$ is an axle set in the plate $d$ and passing through the plate $c$, at which end is a wheel, $h'$. This wheel $h'$ is to be divided up with holes taking a point, the same as in an ordinary gear-cutting machine, and the end of said axle $h$, near the plate $d$, is hollow, to receive a bolt and nut, as seen in red lines in Fig. 2, whereby a wheel or similar article can be attached to said axle $h$ and turned and held in position by the wheel $h'$, as required for the presentation of the article to be operated upon to the tool or tools. The wheel $h'$ might be moved by a worm-pinion or other usual means.

Having thus described the mode of holding and presenting the article to be finished to the tools, I now proceed to state what the tools are and how they are manipulated, controlled, or actuated. On the bed $a$ are V-slides taking the sliding plate $k$, which has a longitudinal motion on said slides, and may be actuated by a screw or be clamped to its position when adjusted. On this plate $k$ are vertical flanges $k'$, between which is a secondary bed, $l$, having also side flanges, $l'$, and these flanges are united by bolts at 9 9 in such a manner that the rear part of this secondary bed $l$ can be lifted up and stand at any angle from a vertical to a horizontal position, and there be held by the screws and nuts 10 10, acting in quarter-circle slots in the flanges $k'$ to bind the flanges $k'$ and $l'$ together and hold this secondary bed $l$ in the position at which it may be placed, the bolts at 9 9 forming the center for the said bed $l$ to be turned on, and one of these bolts is hollow to pass a short shaft, 11, that communicates motion to the parts actuating the tools. The shaft 11 itself is moved through the intervening gears 12 by the shaft $i$, that passes through the cone of pulleys $m$, and this shaft and cone of pulleys are supported by a standard, $m'$, attached to the bed $a$, and the shaft $i$ is to be provided with a feather or key-seat, so as to be rotated by the pulleys $m$, but slide through them as the plate $k$ is moved longitudinally on the bed $a$. The secondary bed $l$ carries a slide, $n$, that receives the tools, and this slide $n$ can be clamped in place, if necessary, to hold it firmly as the plate $k$ and parts it carries are moved; or it can be given a sliding motion, (in $l$,) more or less as required, by a connecting-rod, $o$, (see dotted lines in Fig. 1,) that passes to a crank-pin in the wheel $p$, and this wheel $p$ is driven by a pinion, 13, that is moved by a bevel-gear, 14, and wheel 15, which latter is driven by a bevel-pinion, 16, on the shaft 11. By changing the position of the crank-pin in the wheel $p$ more or less sliding movement will be given to the slide $n$, or by removing said crank-pin or disconnecting the rod $o$ the slide $n$ can remain quiescent while the pinion 16 and gears connected to the wheel $p$ continue to revolve. The wheel 15 is on a sleeve, $t$, between bearings $s\ s$, and a rod, $r$, passes through the same, and this rod should be grooved and a key provided in the sleeve taking said groove, so as to rotate this rod $r$.

We will now consider briefly some of the modes of applying my machine to various practical operations.

For drilling or boring, attach the article to the table $g$, adjust said table to present the article to the tool, attach the boring or drilling tool upon the end of the bar $r$ in any usual manner, and said bar and tool will be revolved by the sleeve $t$ and gearing aforesaid. If the boring or drilling is to be horizontal, the end of said bar $r$ may project from the slide $n$, and the whole bed $k$ and parts carried by it may be moved along as the drilling or boring progresses. If the drilling or boring is to be diagonal or at an inclination, or vertical, the secondary bed is to be moved and clamped, as described, and the operation be performed by forcing the boring-bar $r$ along through the sleeve $t$ by any suitable means, such as a lever and weight, applied thereto, or otherwise.

For planing or slotting, attach the tool-holder $w$, at the end of the slide $n$, as shown in Fig. 2, by means of screws 17, and place in the same any suitable tool, $v$, in the usual manner. Connect the rod $o$ so that the crank-pin (in $p$) will give the necessary reciprocating movement to the slide $n$, and then present the article to be planed or slotted by means of the table $g$ and the adjustments thereof; or, in case the planing or slotting is required at an inclination or vertically, the same is accomplished by the movement of the bed $l$, and clamping it in position, as aforesaid.

The end of a crank may be finished off as an arc of a circle by attaching the eye at the end of the shaft $h$ and rotating the same gradually by the wheel $h'$ as the planing progresses. If more convenient, the tool may be placed in the holder $w$ on the upper part of the slide $n$. (See red lines in Fig. 2.) This position is the most convenient when the machine is employed for slotting, and the bed $n$ stands vertically.

For slabbing and gear-cutting, attach the stock $x$ to the end of the slide $n$, as seen in Fig. 3. This stock carries the shaft 18, on which is placed the burr or cutter $y$ that is in the form of a cylinder or wheel, or of any shape desired. 19 20 are gears to the second shaft, 21, from which miter-gears 22 23 connect with the bar $r$, so that rotation is given by this means to the said burr or cutter $y$. If a surface is to be dressed off or slabbed, the same is to be mounted on the table $g$ and presented to the cutter, and said cutter or burr may move with the slide $n$ horizontally over the surface to be dressed, or in an inclined position, or vertically, as desired, and the end of the slide $n$ being round admits the burr and its shaft, together with the stock $x$, to be placed on said end at right angles to that shown, holes being provided for the screws 17. The cutting of spur-wheels, bevel and miter wheels, and pinions is effected by this burr, applied as aforesaid, the wheel itself being mounted at the end of the shaft $h$, and successively turned and held by the wheel $h'$, and the burr itself is moved either horizontally or at an inclination to said wheel, as required. The size of the wheel is provided for by raising or lowering the plates $c$ and $d$ and shaft $h$.

Having thus described my said invention, and shown the mode of using the same, what I claim, and desire to secure by Letters Patent, is—

1. The arrangement of the plates $c$ and $d$, screws $e\ e\ e'\ e'$, actuated by the shafts 4, 5, and 6, and gearing connecting the same, in combination with the table $g$, applied as and for the purposes specified.

2. The shaft $h$, and wheel $h'$, in combination with the said plates $c$ and $d$, adjusted as aforesaid, and applied in the manner and for the purposes specified.

3. The secondary bed $l$, in combination with the plate $k$, when said bed and plate are connected by the flanges in substantially the manner specified, so as to provide for inclining the second bed, $l$, as and for the purposes set forth.

4. The arrangement of the gearing 13, 14, 15, and 16 for actuating the wheel $p$ that gives an end movement to the rod $o$, and slide $n$, as set forth.

5. The slide $n$, applied as aforesaid, in combination with the tool-stock $x$, and rotary burr or cutter $y$, fitted and acting as and for the purposes specified.

In witness whereof I have hereunto set my signature this 9th day of May, 1862.

D. SAUNDERS.

Witnesses:
 LEMUEL W. SERRELL,
 CHAS. H. SMITH.